(12) United States Patent  (10) Patent No.: US 8,946,957 B2
Baumann et al.  (45) Date of Patent: Feb. 3, 2015

(54) CABLE ARRANGEMENT SYSTEM

(71) Applicant: Caterpillar Inc., Peoria, IL (US)

(72) Inventors: Jonathan Matthew Baumann, Peoria, IL (US); David Fee, Groveland, IL (US); Joseph D. Tigue, Peoria, IL (US); Nathan Benjamin Russell, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 276 days.

(21) Appl. No.: 13/659,244

(22) Filed: Oct. 24, 2012

(65) Prior Publication Data

US 2014/0111044 A1  Apr. 24, 2014

(51) Int. Cl.
*H02K 11/00* (2006.01)
(52) U.S. Cl.
USPC .............................................. 310/71; 174/59
(58) Field of Classification Search
None
See application file for complete search history.

(56) References Cited

U.S. PATENT DOCUMENTS

| | | | |
|---|---|---|---|
| 3,153,695 A * | 10/1964 | Hill et al. | 174/544 |
| 3,244,794 A * | 4/1966 | Hill et al. | 174/481 |
| 5,245,131 A * | 9/1993 | Golden et al. | 174/652 |
| 7,273,985 B2 | 9/2007 | Holmberg et al. | |
| 7,544,901 B2 | 6/2009 | Ehmann | |
| 2008/0160823 A1* | 7/2008 | Jocham et al. | 439/404 |

FOREIGN PATENT DOCUMENTS

DE  19640816  4/1997

OTHER PUBLICATIONS

Cable Entry Systems EMC Solutions—http://www.buttkereit.co.uk/downloads/Cable%20Entry%20Systems.pdf—Page No. 18.

* cited by examiner

*Primary Examiner* — Tran Nguyen
(74) *Attorney, Agent, or Firm* — Jeff A. Greene

(57) ABSTRACT

A cable arrangement system for one or more sets of cables to an electric machine is provided. The cable arrangement system includes a terminal box, a compression plate, multiple glands, and a multipoint connector. The terminal box is disposed on a housing of the electric machine and includes a first side having a first set of openings. The compression plate is releasably engaged with the first side and defines a second set of openings axially aligned with the first set of openings. The glands are configured to receive the first set of cables. Each of the glands includes a first and a second portion received in the first and the second set of openings respectively. The multipoint connector is disposed within the terminal box and includes a first and a second set of terminals configured to engage with lugs associated with the first and a second set of cables.

36 Claims, 7 Drawing Sheets

CABLE ARRANGEMENT SYSTEM

TECHNICAL FIELD

The present disclosure relates to a cable arrangement system and more particularly to a cable arrangement system for one or more sets of cables to an electric machine.

BACKGROUND

Conventional cable enclosures may generally organize cables to a housing of an electric machine. Further, glands may be connected to the cables to grip the cables. Furthermore, one or more O-rings may be provided to form a seal between the gland and the enclosure to reduce fluid leakage from between the gland and the enclosure. The O-ring may be slipped onto the gland thus forming a seal between the gland and the enclosure. An electric machine with many such cables may require several glands and O-rings to be assembled onto the cables. The addition of an O-ring to each gland may increase a part-count of the overall electric machine thereby increasing manufacturing and assembling costs. Further, although the O-rings may be provided to form a seal between the gland and the enclosure, the sealing of the gland to the enclosure may be negatively impacted by the large number of the O-rings used. Thus, more leak-prone joints may be conversely created by the use of many O-rings in the assembly. Furthermore, these glands and O-rings may typically be compressed, individually, in order to grip the cable and seal the gland relative to the enclosure. Individual compression of the glands and O-rings may make the assembly process tedious and cumbersome.

In another aspect of the conventional cable enclosures, the cable enclosures may define holes that are randomly distributed on the enclosure. This may entail a large collective space-claim by the cables entering the enclosure thereby making tool entry and manipulation within the enclosure difficult incase an operator desires to perform a service routine.

U.S. Pat. No. 7,273,985 relates to an enclosure including a cable seal. The cable seal provides a seal around a cable entering the enclosure and also seals against the enclosure. The enclosure can be replaced about the cable without the end of the cable passing through the cable seal. The cable seal may include one or more nuts threaded about a threaded body which are configured to compress an inner and an outer gasket to seal about the cable and to the enclosure.

SUMMARY OF THE DISCLOSURE

In one aspect, the present disclosure provides a cable arrangement system for one or more sets of cables to an electric machine. The cable arrangement system includes a terminal box, a compression plate, multiple glands, and a multipoint connector. The terminal box is disposed on a housing of the electric machine. The terminal box includes a first side having a first set of openings. The compression plate is releasably engaged with the first side and defines a second set of openings axially aligned with the first set of openings. The glands are configured to receive the first set of cables. Each of the glands includes a first and a second portion received in the first and the second set of openings respectively. The multipoint connector is disposed within the terminal box and includes a first and a second set of terminals configured to engage with lugs associated with the first and a second set of cables In another aspect, the present disclosure discloses a cable arrangement system for one or more sets of cables to an electric machine. The cable arrangement system includes a terminal box, a side cover, a compression plate, multiple glands, and a multipoint connector. The terminal box is disposed on a housing of the electric machine. The terminal box includes a first side defining a first cut-out portion. The side cover is disposed on the first cut-out portion of the terminal box and has a first set of openings. The compression plate is releasably engaged with the side cover and defines a second set of openings axially aligned with the first set of openings. The glands are configured to receive the first set of cables. Each of the glands includes a first and a second portion received in the first and the second set of openings respectively. The multipoint connector is disposed within the terminal box and includes a first and a second set of terminals configured to engage with lugs associated with the first and a second set of cables.

In another aspect, the present disclosure discloses an electric machine. The electric machine includes a rotor assembly, a stator assembly, a housing, and a cable arrangement system for one or more sets of cables configured to connect to the stator assembly. The stator assembly is disposed around and connected to the rotor assembly. The housing is disposed around the stator assembly. The cable arrangement system includes a terminal box, a side cover, a compression plate, multiple glands, and a multipoint connector. The terminal box is disposed on a housing of the electric machine. The terminal box includes a first side defining a first cut-out portion. The side cover is disposed on the first cut-out portion of the terminal box and has a first set of openings. The compression plate is releasably engaged with the side cover and defines a second set of openings axially aligned with the first set of openings. The glands are configured to receive the first set of cables. Each of the glands includes a first and a second portion received in the first and the second set of openings respectively. The multipoint connector is disposed within the terminal box and includes a first and a second set of terminals configured to engage with lugs associated with the first and a second set of cables.

Other features and aspects of this disclosure will be apparent from the following description and the accompanying drawings.

DETAILED DESCRIPTION

Figure 1:
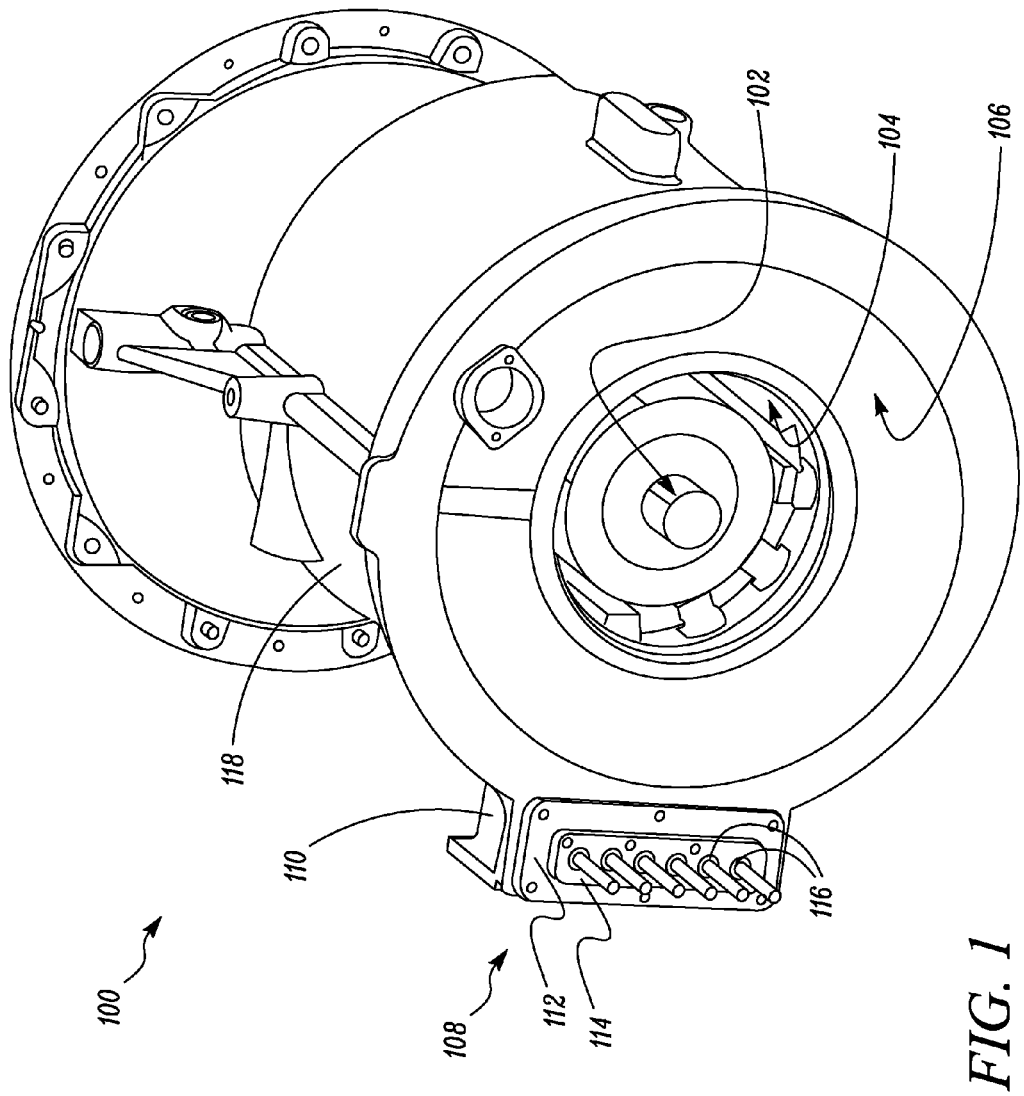
FIG. 1 is a perspective view of an exemplary electric machine in accordance with an embodiment of the present disclosure.

The present disclosure relates to a cable arrangement system for one or more sets of cables to an electric machine. FIG. 1 shows a perspective view of an exemplary electric machine 100. The electric machine 100 may be, for example, an alternator, a motor, a generator, an inverter and the like. In an embodiment, the electric machine 100 may be an electric cabinet configured to be associated with one or more devices commonly known in the art. In an embodiment, as shown in FIG. 1, the electric machine 100 may embody a motor which may be used for producing generating mechanical power. The motor may be one that is used to drive various heavy components such as pumps, compressors, and the like.

The electric machine 100 includes a rotor assembly 102, a stator assembly 104, a housing 106, and a cable arrangement system 108. The stator assembly 104 is disposed around the rotor assembly 102. The stator assembly 104 may be electrically or magnetically connected to the rotor assembly 102 as commonly known in the art. The housing 106 is disposed around the stator assembly 104. The cable arrangement system 108 includes a terminal box 110, a side cover 112, a compression plate 114, and multiple glands 116.

The terminal box 110 is disposed on the housing 106. In an embodiment as shown in FIG. 1, the terminal box 110 may extend from an outer surface 118 of the housing 106. In an embodiment, a shape of the terminal box 110 may be substantially polygonal. In an embodiment as shown in FIG. 1, the shape of the terminal box 110 may be rectangular. In alternative embodiments, the shape of the terminal box 110 may be square, elliptical and the like. Although in the preceding embodiments, it is disclosed that the terminal box 110 is rectangular shaped, square shaped, or elliptical, a person of ordinary skill in the art will acknowledge that the shape of the terminal box 110 disclosed herein is exemplary in nature and does not limit the scope of this disclosure. Therefore, any shape commonly known in the art may be used to form the terminal box 110.

Figure 2:
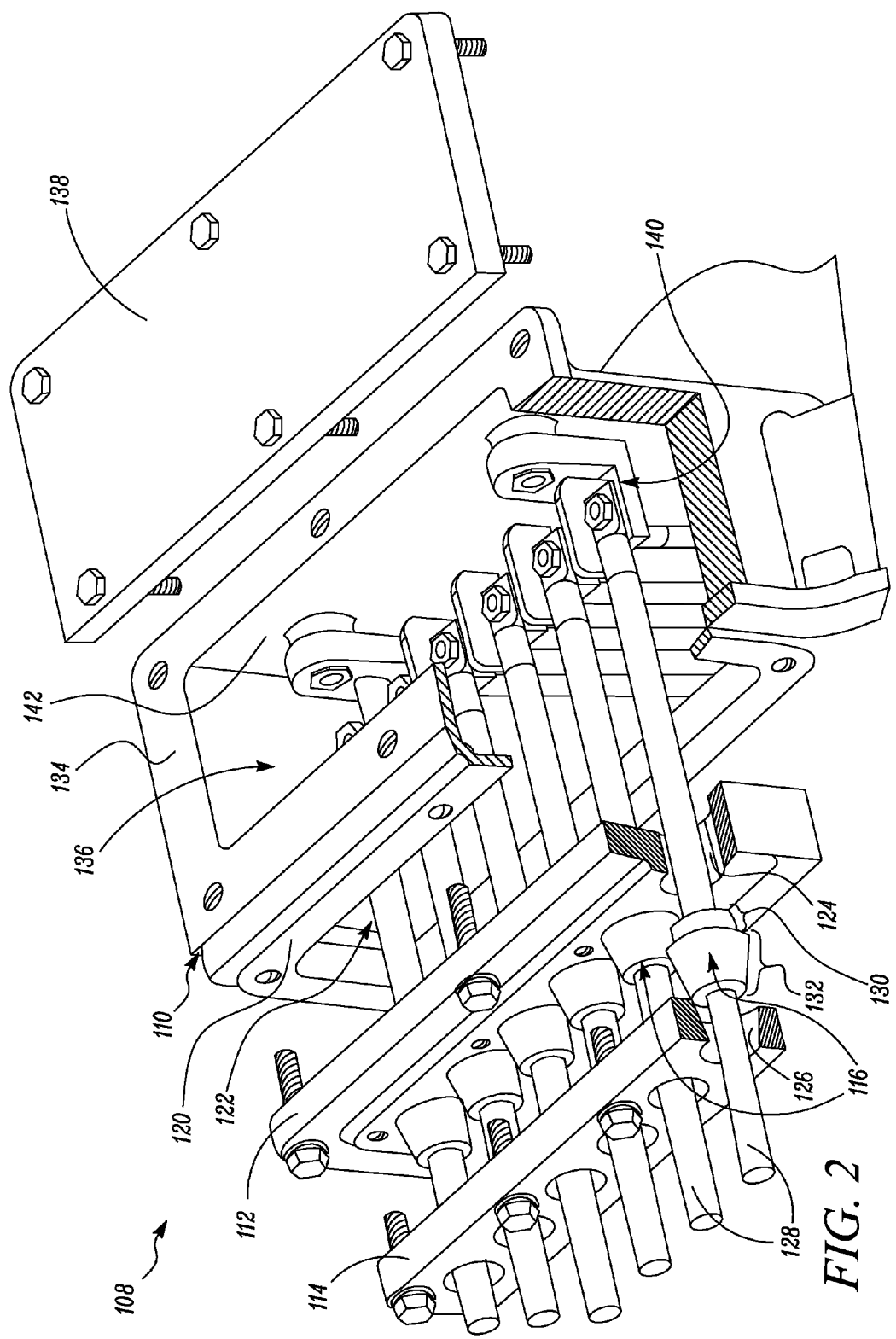
FIG. 2 is an exploded view of the electric machine.

As shown in FIG. 2, the terminal box 110 includes a first side 120 defining a first cut-out portion 122. The side cover 112 is disposed on the first cut-out portion 122 of the terminal box 110 and has a first set of openings 124. The compression plate 114 is releasably engaged with the side cover 112 and defines a second set of openings 126 axially aligned with the first set of openings 124. The glands 116 are configured to receive a first set of cables 128. Each of the glands 116 includes a first portion 130 and a second portion 132. The first portion 130 is received in the first set of openings 124 of the side cover 112. The second portion 132 is received in the second set of openings 126 of the compression plate 114. Thus, upon engaging the compression plate 114 to the side cover 112, the glands 116 may be compressed to grip the first set of cables 128.

In an embodiment as shown in FIG. 2, the first and second set of openings 124, 126 may be annular openings and tapered openings respectively. In an embodiment as shown in FIG. 2, the glands 116 may be frustoconically shaped. In the preceding two embodiments, the first portion 130 and the second portion 132 of the frustoconical glands 116 may adapt to the annular and tapered shape of the first and second set of openings 124, 126 thereby being compressed 116 without pinching, or bulging out.

In an embodiment as shown in FIG. 2, the terminal box 110 may further include a second side 134 disposed adjacent to the first side 120. The second side 134 may define a second cut-out portion 136. In this embodiment, the cable arrangement system 108 may further include a top cover 138 disposed on the second cut-out portion 136 and releasably engaged to the second side 134.

Figure 3:
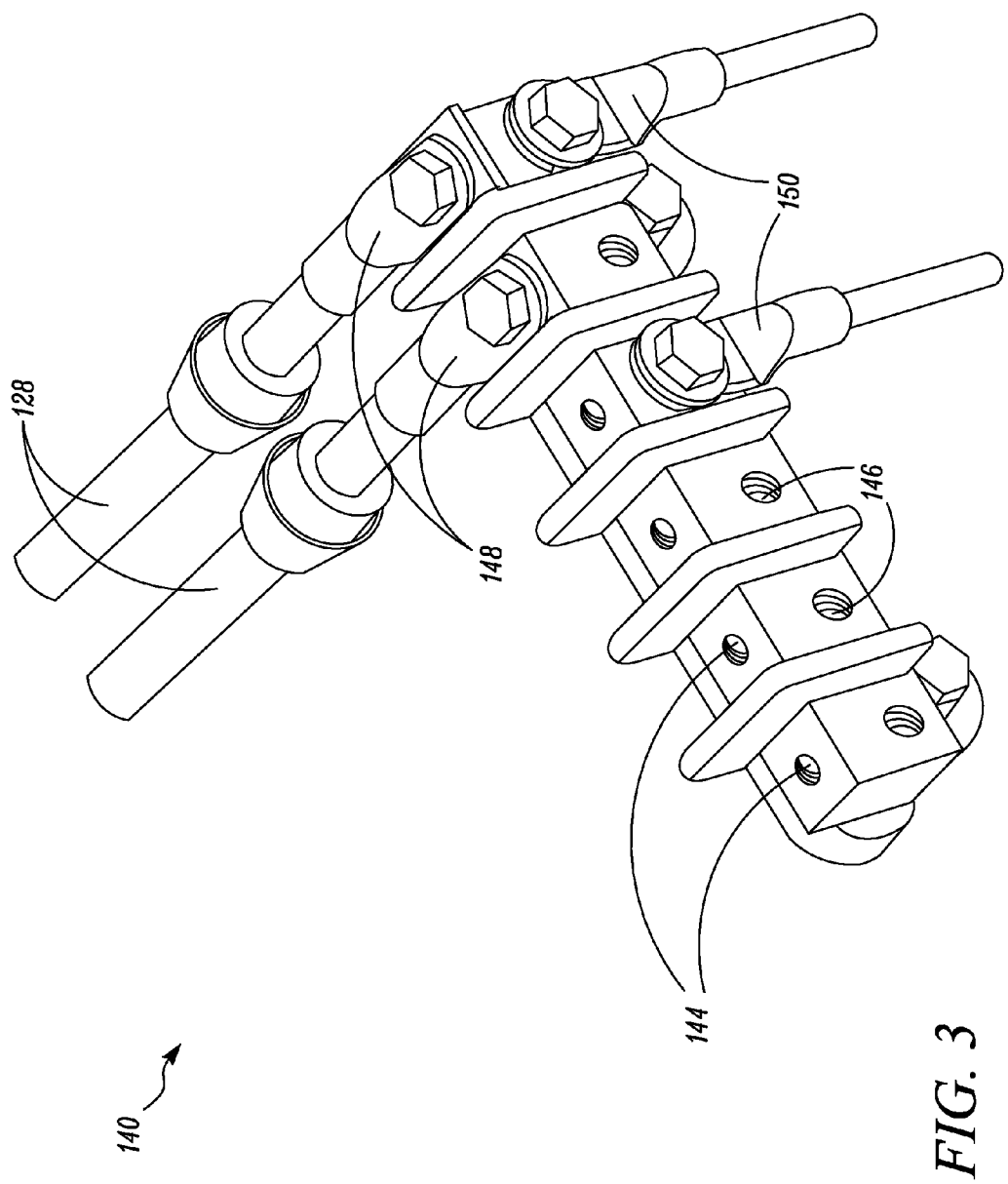
FIG. 3 is a perspective view of a multipoint connector.

As shown in FIG. 2, the cable arrangement system 108 further includes a multipoint connector 140 disposed within the terminal box 110. In an embodiment as shown in FIG. 2, the terminal box 110 may further include a third side 142 disposed opposing the first side 120. In this embodiment, the multipoint connector 140 may be releasably engaged to the third side 142. The multipoint connector 140 includes a first and a second set of terminals 144, 146 as shown in FIG. 3. The first set of terminals 144 is configured to engage with lugs 148 associated with the first set of cables 128. The second set of terminals 146 is configured to engage with lugs 150 associated with a second set of cables 152.

In an embodiment, releasable engagement or engagement disclosed herein may be accomplished by threaded fasteners, for example, bolts and internal thread-bosses. However, in alternative embodiments the releasable engagement between various components of the electric machine 100 disclosed herein may be accomplished by other types of fasteners commonly known in the art. Therefore, a person having ordinary skill in the art may acknowledge that the threaded fasteners accomplishing a releasable engagement between components of the electric machine 100 are only exemplary in nature and hence non-limiting of this disclosure.

Figure 4:
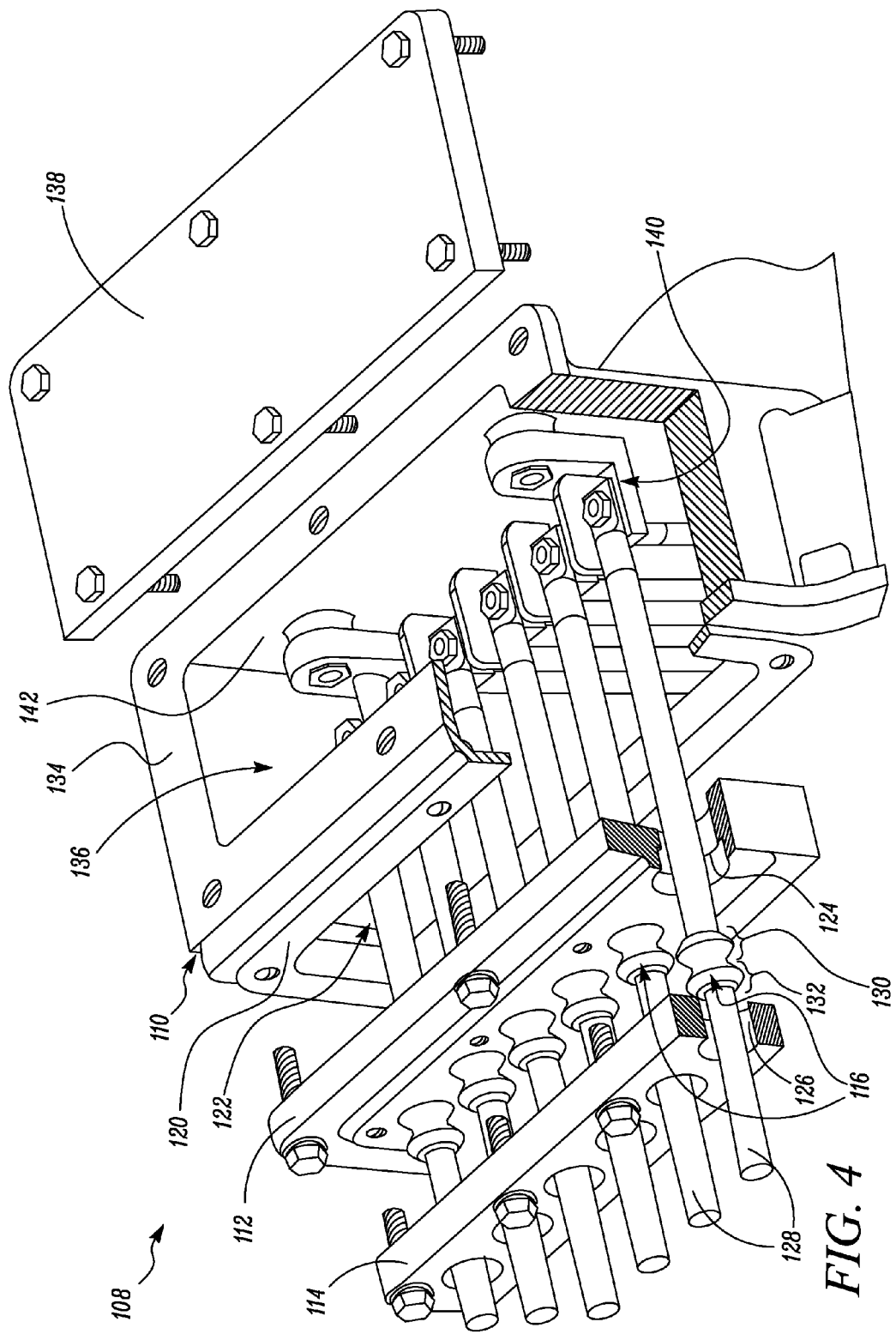
FIG. 4 is an exploded view of the electric machine in accordance with another embodiment of the present disclosure.

In another embodiment as shown in FIG. 4, the first and second set of openings 124, 126 may be counter-bored openings. In another embodiment as shown in FIG. 4, each of the glands 116 may be double donut shaped. In the preceding two embodiments, the double donut shape of the glands 116 may adapt to the counter-bored shape of the first and the second set of openings 124, 126 thereby being compressed without pinching, or bulging out.

Figure 6:
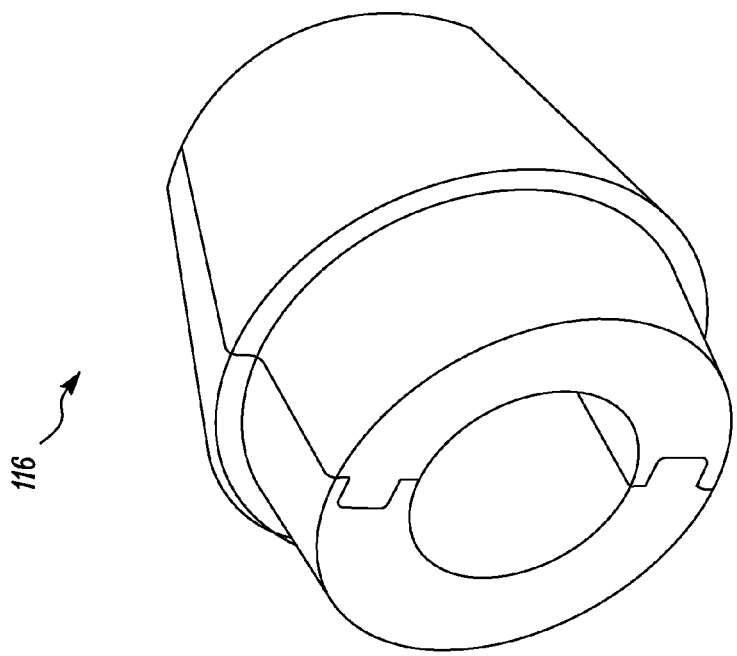
FIGS. 5-6 show a perspective view of a gland in accordance with an embodiment of the present disclosure.
Figure 5:
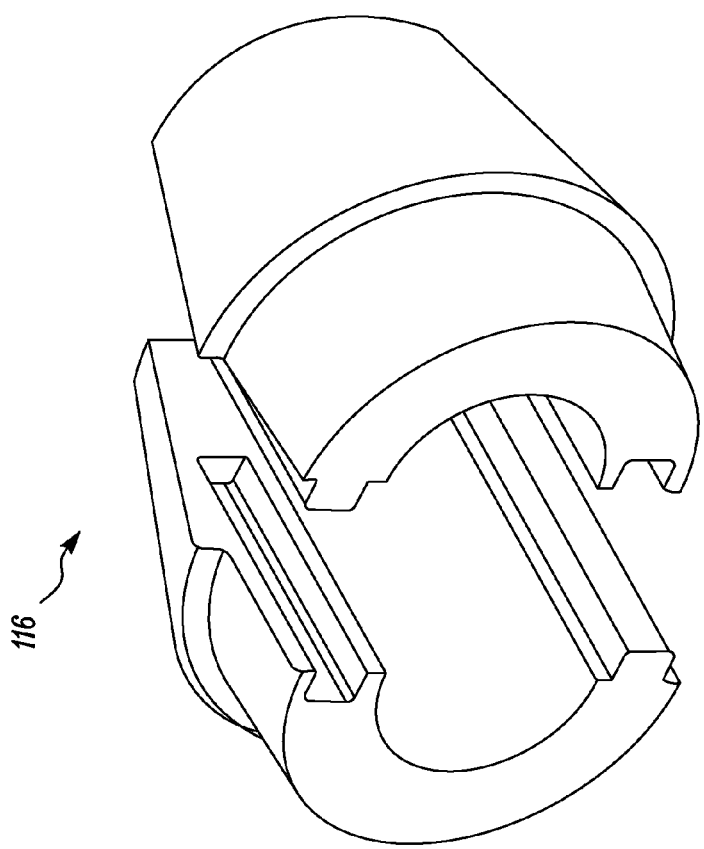

In an embodiment as shown in FIG. 5-6, the gland 116 may be a two-piece split gland 116 configured to receive and press-fit onto the cable. In another embodiment, the gland 116 may be a unitary gland 116 configured to be slipped onto the cable. In an embodiment, the gland 116 may be of a substantially elastomeric material, for example, rubber. Although it is disclosed in preceding embodiments that the gland 116 may be a two-piece gland 116 and that the gland 116 may be of a substantially elastomeric material, a person of ordinary skill in the art will acknowledge that any number of pieces and any material commonly known in the art may be used to form the gland 116. Therefore, the number of pieces of the gland 116 and the material of the gland 116 disclosed herein are exemplary in nature and hence do not limit the scope of this disclosure.

Figure 7:
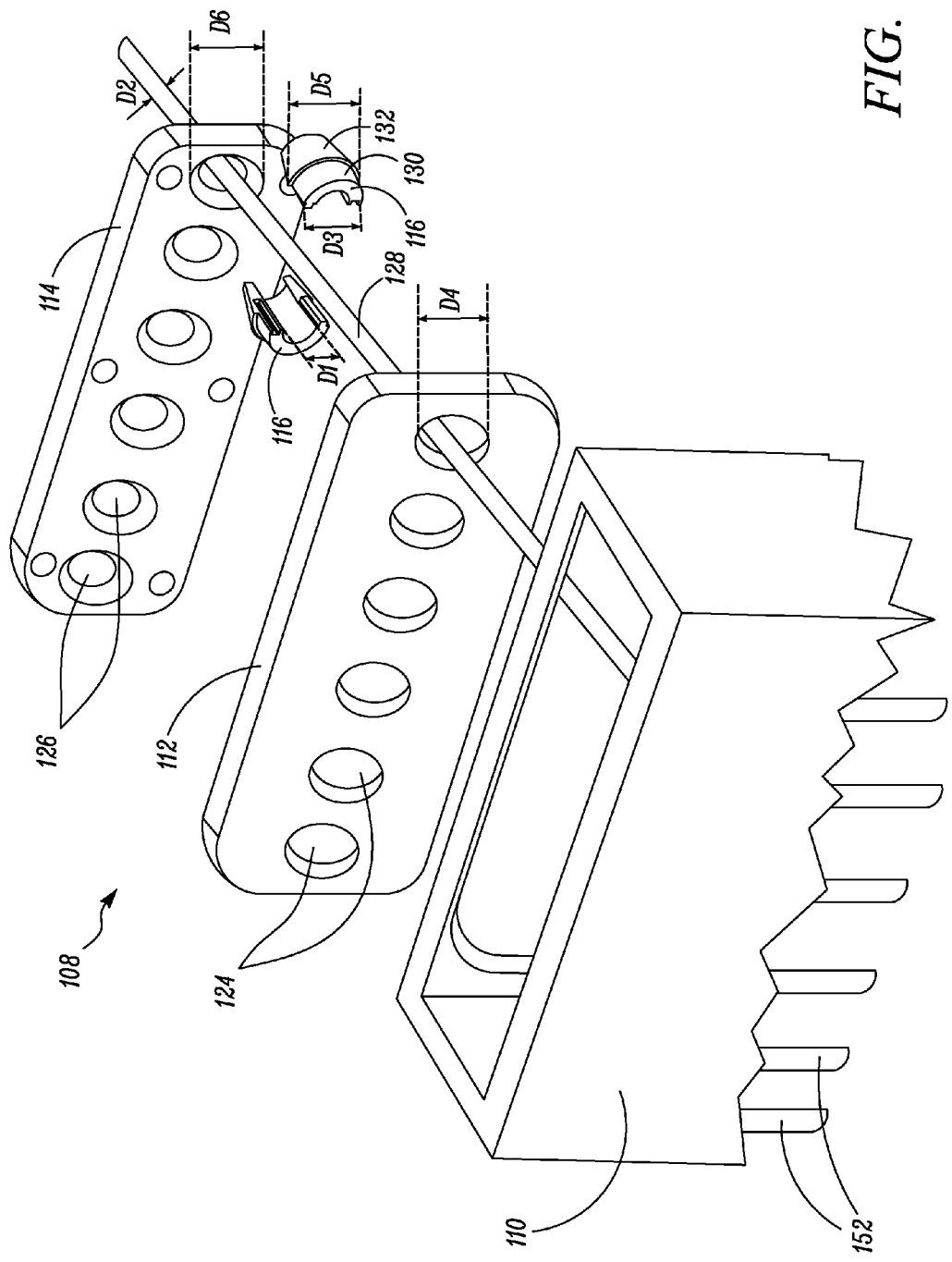
FIG. 7 shows a breakaway perspective view of a cable arrangement system.

FIG. 7 shows a breakaway perspective view of the cable arrangement system 108. For the purposes of clearer illustration and better understanding of this disclosure, a portion of the cable arrangement system 108 has been disassociated from the housing 106 of the electric machine 100 and shown in FIG. 7. In an embodiment, an inner diameter D1 of the gland 116 may be equal to or less than an outer diameter D2 of the cable. In an embodiment, an outer diameter D3 of the first portion 130 of the gland 116 may be equal to or more than an inner diameter D4 of the first set of openings 124. In an embodiment, an outer diameter D5 of the second portion 132 of the gland 116 may be equal to or more than an inner diameter D6 of the second set of openings 126.

Figure 8:
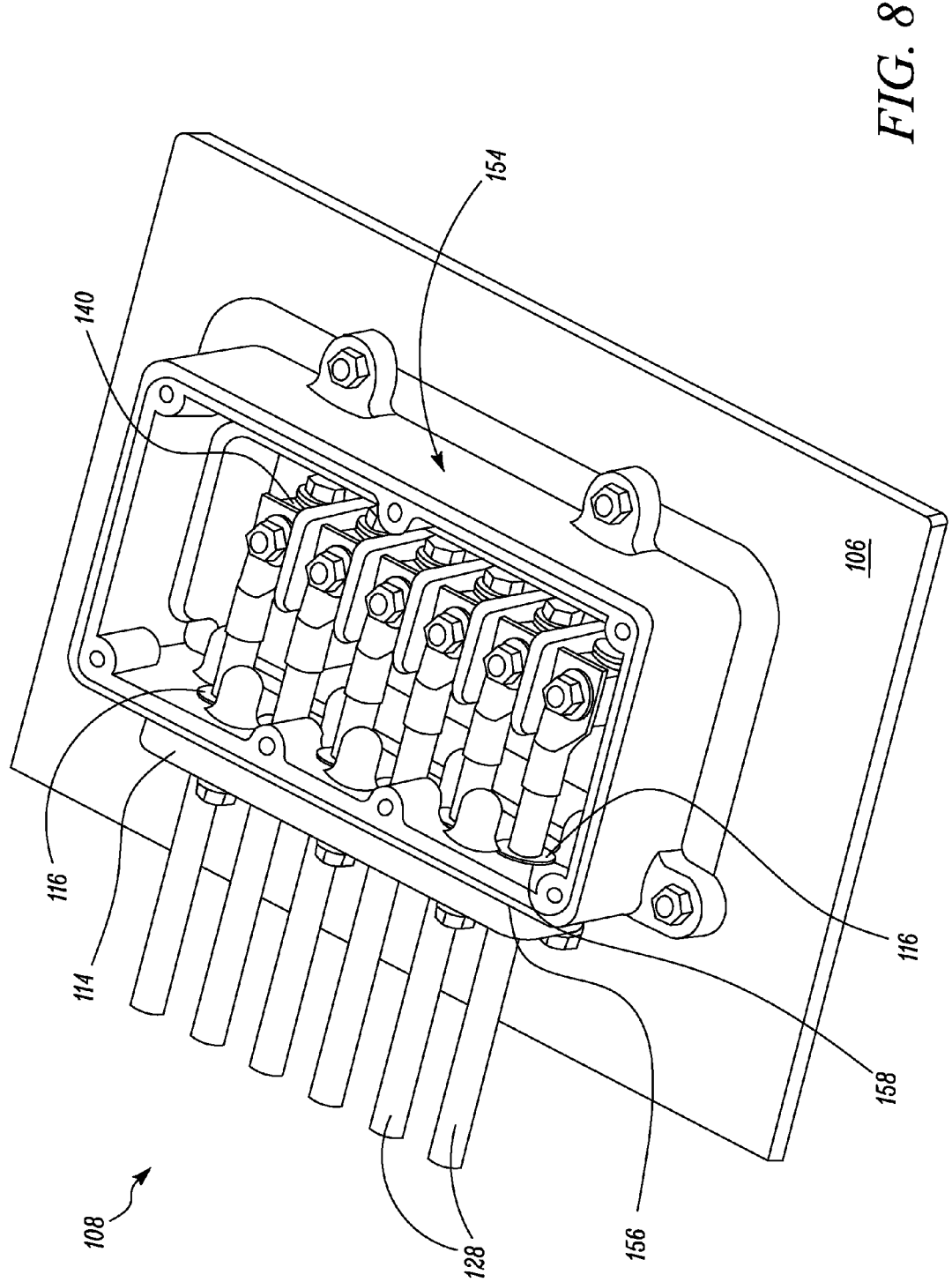
FIG. 8 is a sectional view of the cable arrangement system in accordance with another embodiment of the present disclosure.

In another embodiment as shown in FIG. 8, the cable arrangement system 108 may include a terminal box 154, the compression plate 114, the glands 116, and the multipoint connector 140. In this embodiment, the terminal box 154 may be releasably mounted to the housing 106 of the electric machine 100. Further, a first side 156 of the terminal box 154 may have a first set of openings 158. Furthermore, the compression plate 114 may define the second set of openings 126 axially aligned with the first of openings 158. The compression plate 114 may be releasably engaged with the first side 156 of the terminal box 154. The first portion 130 of the glands 116 may be received in the first set of openings 158 of the terminal box 154 while the second portion 132 of the glands 116 may be received in the second set of openings 126 of the compression plate 114. Thus, the glands 116 may be compressed to grip the first set of cables 128 upon engaging the compression plate 114 at the first side 156 of the terminal box 154.

It may be evident from FIG. 8 that, while assembling the cable arrangement system 108 of the preceding embodiment, the compression plate 114 may be directly engaged with the first side 156 of the terminal box 154 in the absence of the side cover 112. A person having ordinary skill in the art may appreciate that a flexibility may exist in providing the first set of openings 158 at the first side 156 of the terminal box 154 instead of the side cover 112, and that in some specific cases, this flexibility may allow a manufacturer to modify one or more aspects of the cable arrangement system 108 based on end user/application requirements. Therefore, it is to be understood that, although the above disclosure discloses the cable arrangement system 108 as including the side cover 112 or the terminal box 154 as having the first set of openings 124/158, alternative embodiments may be possible without deviating from the scope of this disclosure.

In another embodiment as shown in FIG. 8, the terminal box 154 may be releasably mounted to the housing 106 of the electric machine 100. Thus, the terminal box 154 may be separate from the housing 106 and releasably mounted to the housing 106 by threaded fasteners.

Industrial Applicability

Conventional cable enclosures may generally organize cables to a housing 106 of an electric machine 100. Further, glands 116 may be connected to the cables to grip the cables. Furthermore, one or more O-rings may be provided to form a seal between the gland 116 and the enclosure. However, a machine with many cables may require several glands 116 and/or O-rings assembled onto the cables. Therefore, a part-count of the overall electric machine 100 may increase thereby increasing manufacturing and assembling costs. Furthermore, these glands 116 may typically be compressed, individually, in order to grip the cable and create a sealing force between the cable and the enclosure. Such individual compression of the glands 116 may be a time-consuming and hence tiresome process.

In another aspect of the conventional cable enclosures, the cable enclosures may define holes that are randomly distributed on the enclosure. This may entail a large collective space-claim by the cables entering the enclosure thereby making tool entry or manipulation within the enclosure difficult incase an operator desires to perform a service routine.

The terminal box 110 or side cover 112 disclosed herein includes the first set of openings 124/158 corresponding to the first portion 130 of the glands 116. Further, the compression plate 114 includes the second set of openings 126 corresponding to the second portion 132 of the glands 116. The compression plate 114 may be releasably engaged to the terminal box 110/side cover 112 by threaded fasteners thereby simultaneously compressing all of the glands 116 disposed therein. Further, the compressed glands 116 may create a positive sealing force and an assembler may do away with O-rings or other sealing systems. Furthermore, simultaneous and uniform compression of the glands 116 may reduce time and effort required in creating leak-less joints and assembling the cable arrangement system 108 for the electric machine 100.

Furthermore, when the operator wishes to perform service of any component within the terminal box 110, he may disengage one or more of the top cover 138 and the side cover 112 to access the components disposed therein. Thus, tool entry and manipulation may be accomplished with ease thereby improving serviceability of the cable arrangement system 108. Therefore, an assembly and use of the electric machine 100 may be easy and economical.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A cable arrangement system for one or more sets of cables to an electric machine, the cable arrangement system comprising:
    a terminal box disposed on a housing of the electric machine, the terminal box including a first side having a first set of openings;
    a compression plate releasably engaged with the first side, the compression plate having a second set of openings axially aligned with the first set of openings;
    a plurality of glands configured to receive a first set of cables, each of the glands including:
        a first portion received in the first set of openings; and
        a second portion received in the second set of openings; and
    a multipoint connector disposed within the terminal box, the multipoint connector including:
        a first set of terminals configured to engage with lugs associated with the first set of cables; and
        a second set of terminals adjacently disposed and electrically connected to the first set of terminals, the second set of terminals configured to engage with lugs associated with a second set of cables.

2. The cable arrangement system of claim 1, wherein the terminal box is configured to be releasably mounted to the housing.

3. The cable arrangement system of claim 1, wherein the terminal box further includes a second side adjacent to the first side, the second side defining a second cut-out portion.

4. The cable arrangement system of claim 3 further including a top cover disposed on the second cut-out portion and releasably engaged to the second side of the terminal box.

5. The cable arrangement system of claim 1, wherein the terminal box further includes a third side disposed opposing the first side, the multipoint connector releasably engaged to the third side.

6. The cable arrangement system of claim 1, wherein an inner diameter of the gland is one of equal to and less than an outer diameter of the cable.

7. The cable arrangement system of claim 1, wherein an outer diameter of the first portion of the gland is one of equal to and more than an inner diameter of the first set of openings.

8. The cable arrangement system of claim 1, wherein an outer diameter of the second portion of the gland is one of equal to and more than an inner diameter of the second set of openings.

9. The cable arrangement system of claim 1, wherein the first and second set of openings are annular openings and tapered openings respectively.

10. The cable arrangement system of claim 1, wherein the first and second sets of openings are counter-bored openings.

11. The cable arrangement system of claim 1, wherein the gland is one of frustoconical shaped and double donut shaped.

12. The cable arrangement system of claim 1, wherein the gland is of a substantially elastomeric material.

13. A cable arrangement system for one or more sets of cables to an electric machine, the cable arrangement system comprising:
- a terminal box disposed on a housing of the electric machine, the terminal box including a first side defining a first cut-out portion;
- a side cover disposed on the first cut-out portion of the terminal box, the side cover having a first set of openings;
- a compression plate releasably engaged with the side cover, the compression plate having a second set of openings axially aligned with the first set of openings;
- a plurality of glands configured to receive a first set of cables, each of the glands including:
  - a first portion received in the a first set of openings; and
  - a second portion received in the second set of openings; and
- a multipoint connector disposed within the terminal box, the multipoint connector including:
  - a first set of terminals configured to engage with lugs associated with the first set of cables; and
  - a second set of terminals adjacently disposed and electrically connected to the first set of terminals, the second set of terminals configured to engage with lugs associated with a second set of cables.

14. The cable arrangement system of claim 13, wherein the terminal box is configured to be releasably mounted to the housing.

15. The cable arrangement system of claim 13, wherein the terminal box further includes a second side adjacent to the first side, the second side defining a second cut-out portion.

16. The cable arrangement system of claim 15 further including a top cover disposed on the second cut-out portion and releasably engaged to the second side of the terminal box.

17. The cable arrangement system of claim 13, wherein the terminal box further includes a third side disposed opposing the first side, the multipoint connector releasably engaged to the third side.

18. The cable arrangement system of claim 13, wherein an inner diameter of the gland is one of equal to and less than an outer diameter of the cable.

19. The cable arrangement system of claim 13, wherein an outer diameter of the first portion of the gland is one of equal to and more than an inner diameter of the first set of openings.

20. The cable arrangement system of claim 13, wherein an outer diameter of the second portion of the gland is one of equal to and more than an inner diameter of the second set of openings.

21. The cable arrangement system of claim 13, wherein the first and second set of openings are annular openings and tapered openings respectively.

22. The cable arrangement system of claim 13, wherein the first and second sets of openings are counter-bored openings.

23. The cable arrangement system of claim 13, wherein the gland is one of frustoconical shaped and double donut shaped.

24. The cable arrangement system of claim 13, wherein the gland is of a substantially elastomeric material.

25. An electric machine comprising:
- a rotor assembly; and
- a stator assembly disposed around and connected to the rotor assembly;
- a housing disposed around the stator assembly; and
- a cable arrangement system for one or more sets of cables configured to connect to the stator assembly, the cable arrangement system including:
  - a terminal box disposed on the housing, the terminal box including a first side defining a first cut-out portion;
  - a side cover disposed on the first cut-out portion of the terminal box, the side cover having a first set of openings;
  - a compression plate releasably engaged with the side cover, the compression plate having second set of openings axially aligned with the first set of openings;
  - a plurality of glands configured to receive a first set of cables, each of the glands including:
    - a first portion received in the first set of openings; and
    - a second portion received in the second set of openings; and
  - a multipoint connector disposed within the terminal box, the multipoint connector including:
    - a first set of terminals configured to engage with lugs associated with the first set of cables; and
    - a second set of terminals adjacently disposed and electrically connected to the first set of terminals, the second set of terminals configured to engage with lugs associated with a second set of cables.

26. The electric machine of claim 25, wherein the terminal box is configured to be releasably mounted to the housing.

27. The electric machine of claim 25, wherein the terminal box further includes a second side disposed adjacent to the first side, the second side defining a second cut-out portion.

28. The electric machine of claim 27, wherein the cable arrangement system further includes a top cover disposed on the second cut-out portion, the top cover releasably engaged to the second side of the terminal box.

29. The electric machine of claim 25, wherein the terminal box further includes a third side disposed opposing the first side, the multipoint connector releasably engaged to the third side.

30. The electric machine of claim 25, wherein an inner diameter of the gland is one of equal to and less than an outer diameter of the cable.

31. The electric machine of claim 25, wherein an outer diameter of the first portion of the gland is one of equal to and more than an inner diameter of the first set of openings.

32. The electric machine of claim 25, wherein an outer diameter of the second portion of the gland is one of equal to and more than an inner diameter of the second set of openings.

33. The electric machine of claim 25, wherein the first and second set of openings are annular openings and tapered openings respectively.

34. The electric machine of claim 25, wherein the first and second sets of openings are counter-bored openings.

35. The electric machine of claim 25, wherein the gland is one of frustoconical shaped and double donut shaped.

36. The electric machine of claim 25, wherein the gland is of a substantially elastomeric material.

* * * * *